A. E. WHITE.
SAW SWAGE.
APPLICATION FILED NOV. 4, 1908.
948,197.
Patented Feb. 1, 1910.
3 SHEETS—SHEET 1.
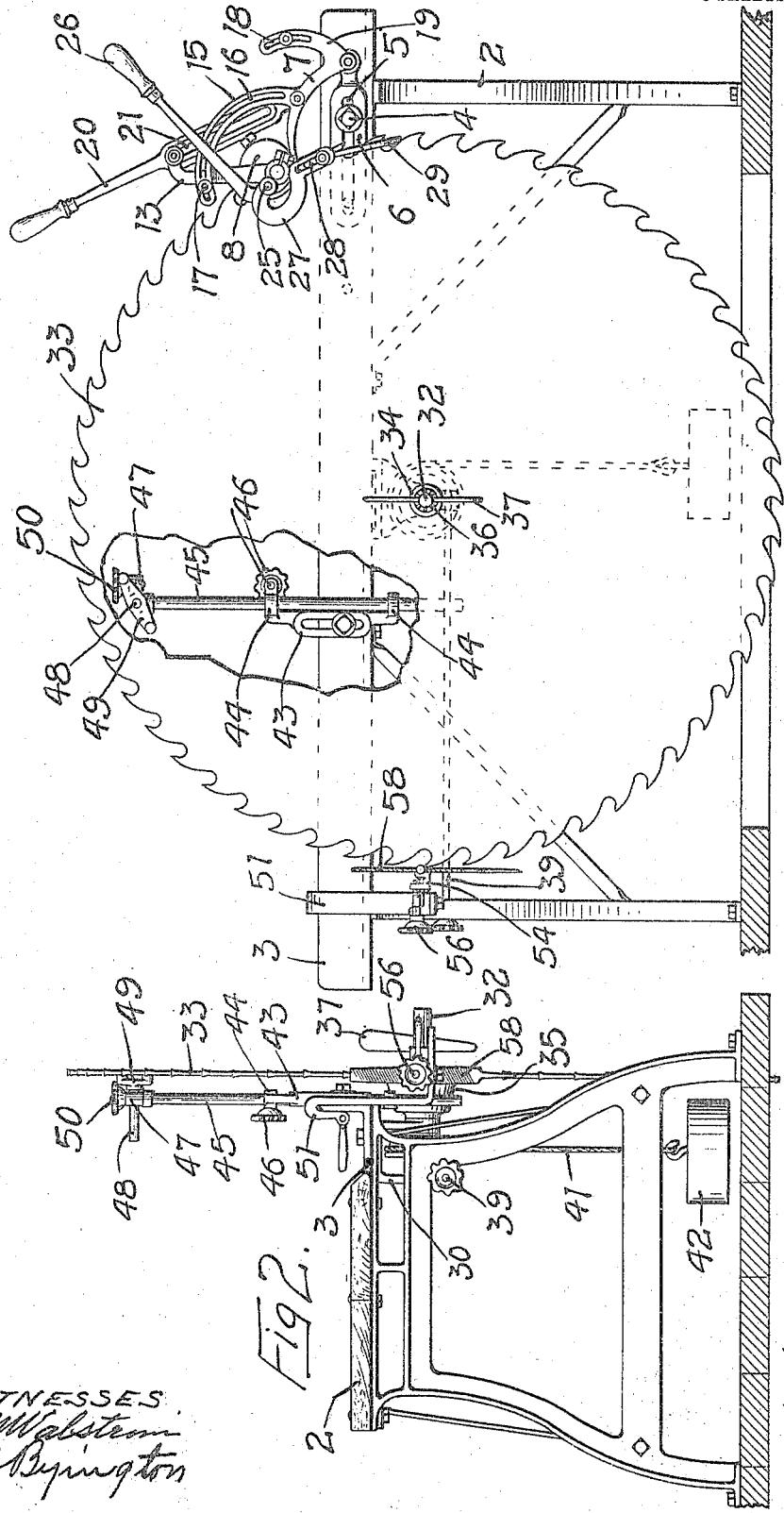
WITNESSES
M W Walstrom
J A Byington
INVENTOR
ALBERT E. WHITE
BY Paul Paul
HIS ATTORNEYS

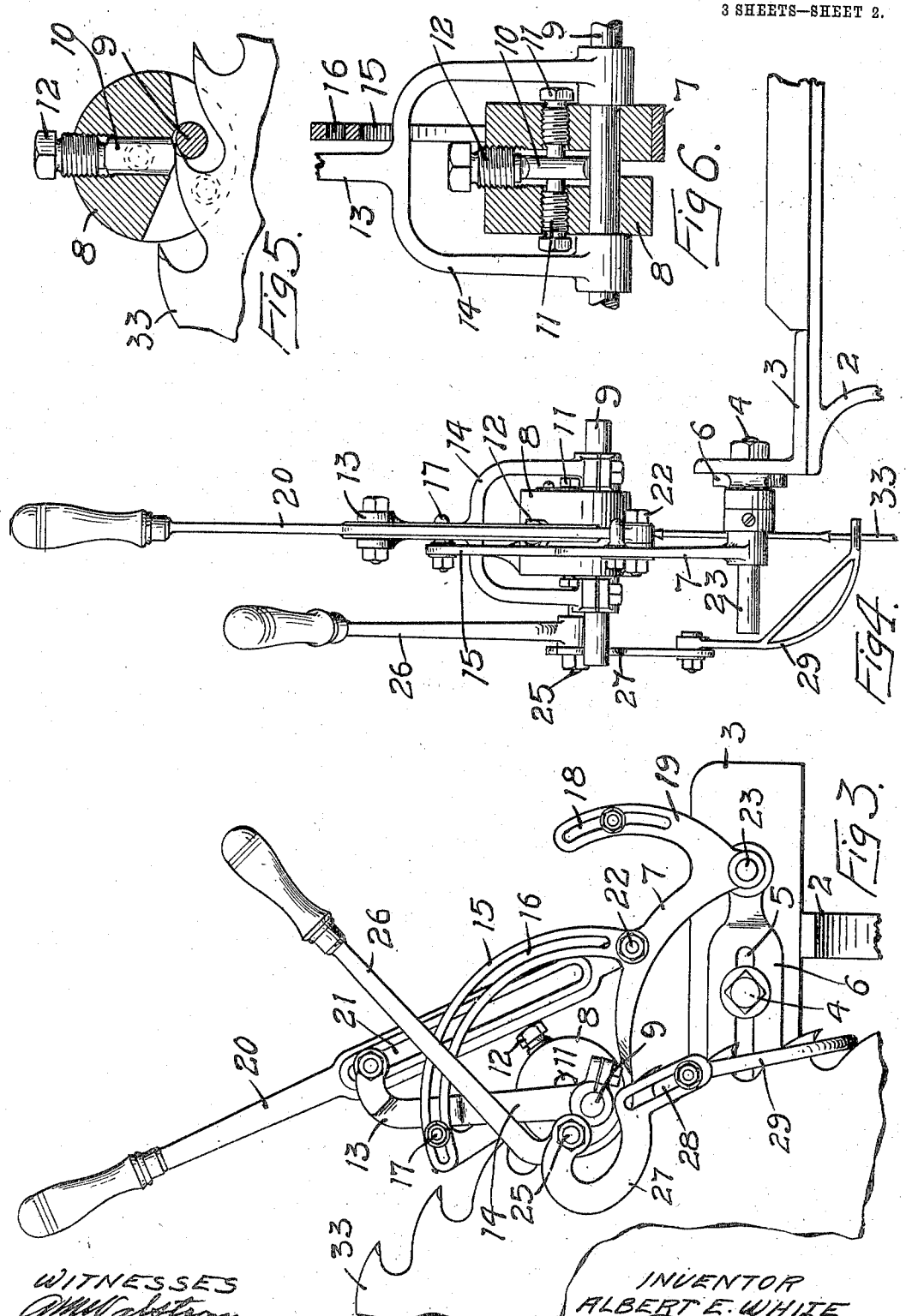

A. E. WHITE.
SAW SWAGE.
APPLICATION FILED NOV. 4, 1908.

948,197.

Patented Feb. 1, 1910.
3 SHEETS—SHEET 3.

WITNESSES
A M Walstrom
J. A. Byington

INVENTOR
ALBERT E. WHITE
BY Paul & Paul
HIS ATTORNEYS

UNITED STATES PATENT OFFICE.

ALBERT E. WHITE, OF EAU CLAIRE, WISCONSIN.

SAW-SWAGE.

948,197.  Specification of Letters Patent.  Patented Feb. 1, 1910.

Application filed November 4, 1908. Serial No. 461,056.

*To all whom it may concern:*

Be it known that I, ALBERT E. WHITE, of Eau Claire, Eau Claire county, Wisconsin, have invented certain new and useful Improvements in Saw-Swages, of which the following is a specification.

This invention relates to saw swages applicable particularly to circular saws which are of comparatively heavy gage and are usually removed from the arbor and mounted on a bench preparatory to the swaging operation.

My invention has for its object to provide improved means for mounting the swage on a bench.

A further object is to provide improved means for rotating the saw to bring the teeth successively into position to be swaged.

A further object, is to provide improved means for holding the saw toward the swage and the teeth in position to be operated upon by the die.

Other objects of the invention will appear from the following detailed description.

The invention consists generally in various constructions and combinations, all as hereinafter described and particularly pointed out in the claims.

Figure 9:
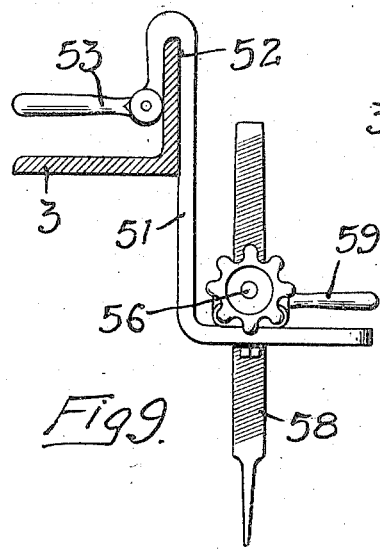
Figure 10:
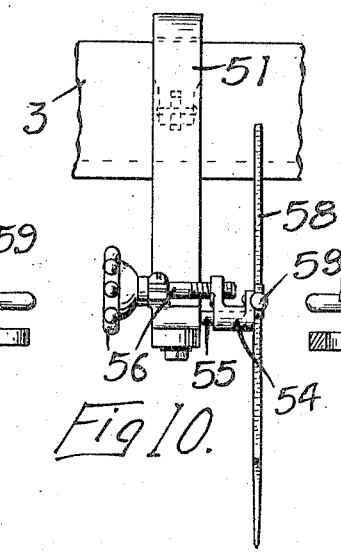
Figure 11:
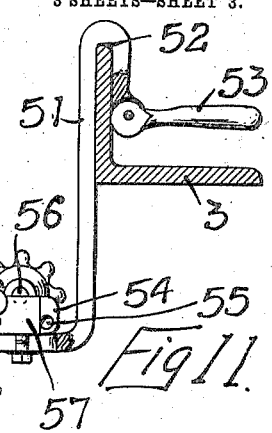
Figure 8:
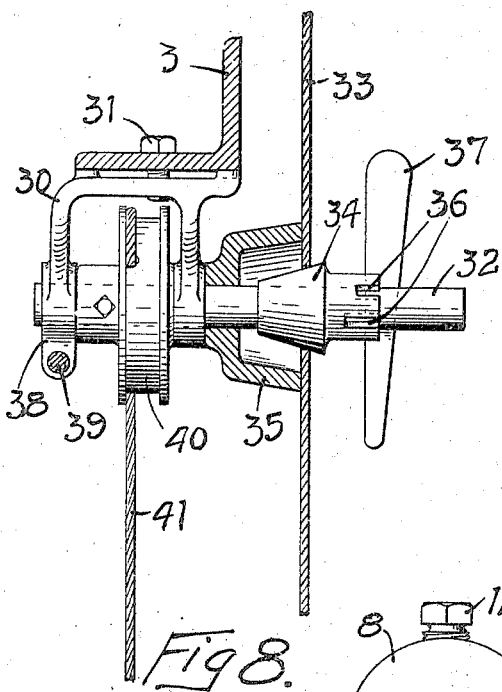
Figure 7:
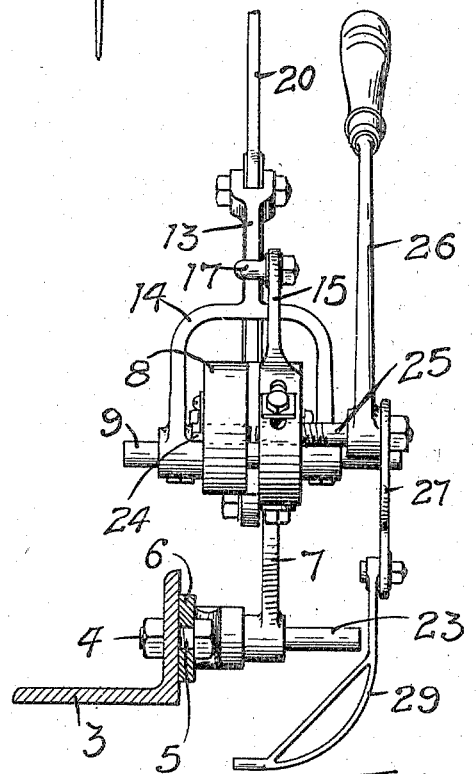
Figure 12:
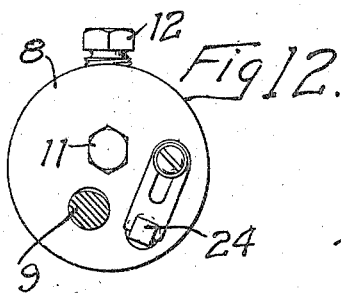

In the accompanying drawings forming part of the specification, Figure 1, is a side elevation illustrating my invention in use, Fig. 2, is an end view of the same, Fig. 3, is a detail view illustrating the mechanism for revolving the saw, Fig. 4, is an end view, Fig. 5, is a detail sectional view of the anvil device, Fig. 6, is a sectional view illustrating the means for holding the anvil in place, Fig. 7, is a view of the mechanism shown in Fig. 4, removed from the saw, Fig. 8, is a detail sectional view showing the manner of mounting the saw on the bench, Figs. 9, 10 and 11 are detailed views of the mechanism for supporting a file in position to bear on the saw teeth, Fig. 12, is a detail view of the block or head in which the die and anvil are mounted.

In the drawing, 2 represents a suitable bench whereon the saw swage mechanism is mounted. An angle bar 3 is secured to the top of said bench and has its vertical flange provided with a horizontally extending bolt 4 which passes through a slot 5 in a plate 6 and adjustably secures the said plate to said angle bar. Upon loosening the bolt, the plate can be tilted up or down or moved lengthwise until the desired angle and position of the saw swaging mechanism with respect to the saw is obtained. A frame 7 is attached at one end to the plate 6 and carries a block 8 in which the die 9 and anvil 10 are arranged substantially as shown and described in my pending application of even date herewith. Screws 11 and 12 clamp the anvil on each side and on the top. A lever 13 which I will designate as a secondary lever having a fork 14, is mounted on the die 9. An arched bar 15 having a slot 16 is formed integral with the frame 7 and carries a stop 17 and a similar stop is adjustably mounted in a slot 18 provided in an arm 19 that projects upwardly from one end of the frame 7. An operating lever 20 has a slot 21 therein, in which the end of the lever 13 is slidably mounted and said lever 20 is pivoted at one end on a bolt 22 that is carried by the frame 7. The stops 17 are in the path of the levers 13 and 20 and limit their oscillating movement. The operation of swaging a tooth is substantially the same as described with reference to the swage of my pending application shown applied to a band saw. The mechanism however employed with this type of swage for operating the die, has an increased leverage on the die in proportion to the increase in the gage of the saw or the width of a tooth over those of the ordinary band saw. The resistance of the tooth will increase as the die is rotated and I have therefore provided a lever mechanism in which there is an increase in the leverage as the resistance of the tooth increases or in other words, the sliding of the lever 13 toward the pivot of the lever 20 will increase the leverage of the lever 20 on the die and enable the operator to swage the circular saw teeth without the great exertion and labor that is usually incidental to the swaging operation of this kind. The bolt 23 upon which the frame 7 is pivoted, is carried by the plate 6 and is adjustable therewith toward and from the saw to allow the operator to set the tool in the desired position and the frame 7 is adapted to slide on the bolt 23 to allow the swage to be alined with the saw.

Clamping screws 24 and 25 are provided in the head 8 for gripping the teeth of the saw and holding the tool securely during the swaging operation, the screw 25 having an operating lever 26. I have provided means for automatically rotating the saw to bring the next tooth in position for swaging after a tooth has been swaged. This device consists of a plate 27 secured at one end on the bolt 25 and having a slot 28 in its opposite end wherein one end of an arm 29 is slidable, said arm having an inwardly curved free end that is adapted to slip in between the teeth of the saw and slide over the teeth when the clamping lever 26 is pulled forward to secure a tooth for swaging. When the movement of lever is reversed, to release the swaged tooth, the arm 29 engages a tooth and rotates the saw until the next tooth to be swaged is carried to a point beyond the swage die. The clamp lever 26 is then reversed, releasing the saw and the weight 42 being attached to the arbor on which the saw is mounted and causing a continuous strain in the opposite direction, the tooth will be pulled forward between the swage dies and held there until secured by the clamp screws. The arm 29 works with the lever 26 and has a ratchet like movement, alternately slipping over the points of teeth and engaging them on the return movement. It will be seen therefore, that the rotation of saw is entirely automatic and does not require any attention on the part of the operator.

The angle bar 3 has a frame 30 depending therefrom and supported by bolts 31 and having bearings for an arbor 32 on which the saw 33 is mounted. A cone 34 is adapted to fit into the central opening in the saw and center it against a hub 35, said cone having a series of slots 36 therein to receive a locking key or wedge 37 that is adapted to pass down through a slot in the arbor 32. A clamp 38 is carried by frame 30 and engages the arbor and a screw 39 allows the clamp to be contracted or extended for the purpose of releasing or gripping the arbor and retarding or hastening the rotary movement of the saw. The cone 34 will fit saws having holes of different diameter therein and the variation in the length of the slots 36 in the cone will allow its position with respect to the saw to be varied and still permit it to be locked by means of the key 37.

A drum 40 is mounted on the arbor 32 and has a cord 41 wound thereon supporting a weight 42, the function of which is to hold the saw teeth in working engagement with the swage, the cord being wound on the drum so that the saw has a tendency to turn backward or toward the swage. The weight is sufficiently heavy to rotate the saw whenever it is released by ratchet arm 29.

For the purpose of holding the edge of the saw in a vertical plane, and steady while filing or performing other work necessary in fitting the saw, I provide a bracket 43 adjustably mounted on the angle bar 3 and having guides 44 for a vertically arranged rod 45 that is clamped in one of said guides by means of a screw 46. The upper end of the rod 45 is provided with a clamp 47 wherein a pin 48 is adjustable toward and from the saw, said pin carrying a cross head 49 which has bearings on the saw surface and prevents lateral movement thereof. The bearing of the pin 48 has a screw 50 by means of which the pin may be clamped and held against longitudinal movement when the desired adjustment is obtained.

On the opposite side of the saw from the swage device is a bracket 51 provided with a socket 52 to receive the vertical flange of the angle bar 3 and said bracket is provided with a cam lever 53 by means of which the bracket is locked in the desired adjustment on the vertical flange. A file carrier 54 is slidably mounted on pins 55 mounted on said bracket, and is movable back and forth on said pins by means of a screw 56. The file carrier has a recess 57 to receive a flat file 58 and a cam lever 59 clamps the file securely in the recess. By the operation of the screw 56, the file may be moved toward or from the teeth of the saw to obtain the desired adjustment.

In the operation of the swage, the frame is adjusted on the bench in proper position to act on the saw teeth and the anvil having been set in the swage head, a saw tooth is inserted between the anvil and the die and the operating lever moved to revolve the die, and swage the tooth. By means of the lever mechanism described, the leverage on the tooth will be gradually increased as the resistance to the swaging operation increases. I am thus able to swage the teeth of a heavy circular saw without requiring excessive exertion on the part of the operator. When the clamping lever is moved to release a tooth, the saw will be rotated a step to bring a fresh tooth in position to be swaged.

I claim as my invention:

1. The combination with a bench, of means supporting a circular saw thereon, a saw swage including a die and an operating lever therefor and means for clamping a saw tooth and means rendered operative by the release of a tooth for automatically revolving the saw step by step, substantially as described.

2. The combination with means for supporting a circular saw, of a swage including a die and an operating lever therefor, and means for clamping a tooth of the saw, and means rendered operative by the release of said clamping means for automatically rotating the saw step by step.

3. The combination with means for supporting a circular saw, of a saw swage comprising a die, a support therefor and an operating lever, clamping screws to engage and clamp the tooth of the saw, an operating lever for one of said screws and means connected with said lever and adapted to engage the saw teeth and rotate the saw step by step when said clamping lever is operated to release a tooth.

4. The combination with means for supporting a circular saw, of a swage including means for clamping a tooth of the saw, said means having an operating lever, a plate pivotally connected with said lever, and an arm having a sliding connection with the said plate and adapted to pass between the teeth of the saw, substantially as described.

5. The combination with a bench, of a swage mounted thereon, a shaft, means for centering a circular saw thereon and means for automatically rotating the saw to bring the teeth into swaging position and hold them during the swaging operation.

6. The combination with a bench, of a saw swage mounted thereon, an arbor and means for centering a circular saw thereon, a drum carried by said arbor, a cord wound thereon and provided with a weight, the power of which is exerted to hold the saw teeth in position to be operated upon by the swage.

7. The combination with a bench, of a saw swage, an arbor whereon the saw is mounted, means for rotating the saw to bring the teeth into position to be swaged and means for resisting the revolution of said arbor to retard the movement of the saw.

8. The combination with an arbor, and its support and means for centering a saw on said arbor, of a saw swage, means for applying power to said arbor, to normally rotate said saw and a clamping device for increasing or decreasing the friction of said arbor in its bearing.

9. The combination, with a support, of a saw swage, a saw arbor, a drum carried by said arbor, a cord wound thereon and provided with a weight, the power of which is exerted to hold the saw teeth in position to be operated upon by the swage.

10. The combination, with means for supporting a circular saw, of a swage having an operating lever, clamping screws between which the saw tooth is gripped, an operating lever for one of said screws, a plate pivotally connected with said operating lever, and an arm pivotally connected with said plate and adapted to pass between the teeth of the saw, substantially as described.

11. The combination, with means for supporting a circular saw, and a swage having an operating lever, a clamping screw, a lever therefor, means connected with said screw operating lever and adapted to engage the saw and rotate it when said lever is operated to release the clamping screw.

In witness whereof, I have hereunto set my hand this twenty fourth day of October 1908.

ALBERT E. WHITE.

Witnesses:
CHARLES F. COFFIN,
HERMAN STOCKHAUSEN, Jr.